(12) United States Patent
Dyer et al.

(10) Patent No.: US 6,250,067 B1
(45) Date of Patent: Jun. 26, 2001

(54) THRUST BUMP SYSTEM FOR FUEL CONTROLS

(75) Inventors: Gerald P. Dyer, Enfield; Mark R. Tardif, Andover; David L. Chapski, Enfield, all of CT (US)

(73) Assignee: United Technologies Corporation, Windsor Locks, CT (US)

( * ) Notice: Subject to any disclaimer, the term of this patent is extended or adjusted under 35 U.S.C. 154(b) by 0 days.

(21) Appl. No.: 09/237,848

(22) Filed: Jan. 27, 1999

(51) Int. Cl.[7] ................................................. F02C 9/26
(52) U.S. Cl. ............................................... 60/39.281
(58) Field of Search ........................................ 60/39.281

(56) References Cited

U.S. PATENT DOCUMENTS

| | | | |
|---|---|---|---|
| 4,137,707 | 2/1979 | Wanger | 60/39.281 |
| 4,794,755 | * 1/1989 | Hutto et al. | 60/39.281 |
| 5,088,278 | * 2/1992 | Smith et al. | 60/39.281 |
| 5,709,079 | * 1/1998 | Smith | 60/39.281 |

FOREIGN PATENT DOCUMENTS

| | | |
|---|---|---|
| 3542273 | 6/1987 | (DE) . |
| 2300451 | 6/1996 | (GB) . |

* cited by examiner

*Primary Examiner*—Louis J. Casaregola

(57) ABSTRACT

According to the present invention, a fuel control has an electronic primary control for scheduling a flow of fuel to an engine in a primary mode and hydromechanical secondary control for scheduling the flow of fuel to the engine in a backup mode. The fuel control also has a tracking piston and link whose position is responsive to the HMU during the operation of the electronic primary control. The tracking piston and link effectively changes the power lever angle sensed by the HMU so that in the event of a transfer of control from the electronic primary control to the HMU, changes in the scheduled fuel flow to the engine are minimized.

11 Claims, 3 Drawing Sheets

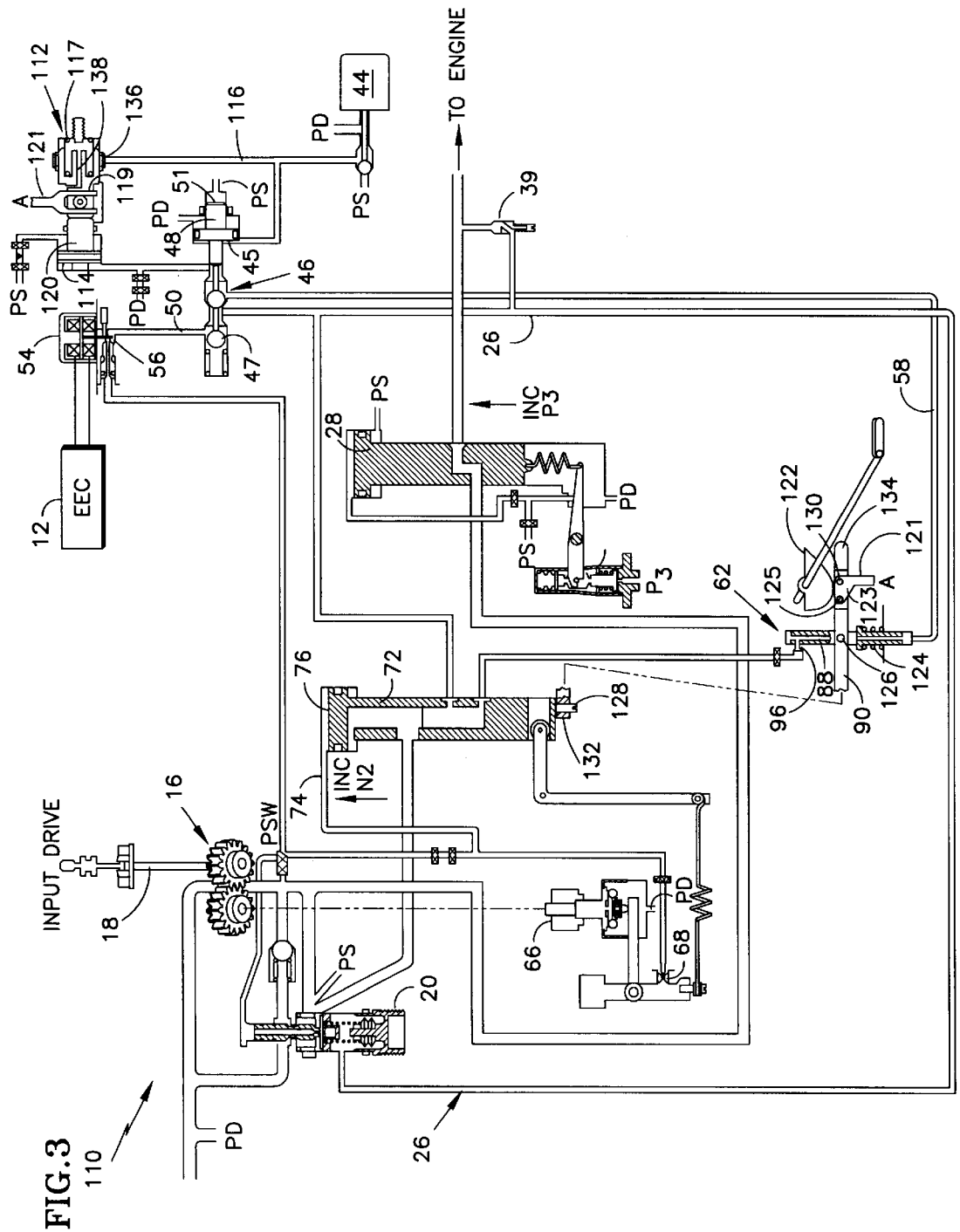

THRUST BUMP SYSTEM FOR FUEL CONTROLS

TECHNICAL FIELD

This invention relates to fuel delivery systems and more particularly to fuel delivery systems for aircraft gas turbine systems.

BACKGROUND ART

It is well known in the art of fuel delivery systems for aircraft gas turbine engines to use a primary electronic fuel control system with a mechanical secondary or backup system for monitoring and scheduling fuel delivery to the engine. The fuel control has two operating modes. In the first or primary mode the electronic engine control (EEC) schedules fuel flow to the engine in conjunction with the hydromechanical unit (HMU). In the backup or secondary mode the fuel delivery to the engine is scheduled by the HMU only.

The problem arises in that the EEC and HMU schedule a different fuel flow in response to pilot input. This is due to the fact that the EEC monitors different parameters than the HMU and can set an optimum engine speed (fuel flow) to achieve a desired thrust level. The HMU sets an engine speed for a given power lever setting. The differences in commanded engine speed are especially critical during takeoff. If the fuel control should switch from the primary to the secondary control the change in commanded engine speed could result in an excessive increase or decrease in engine thrust.

There exists a need, therefore, for a fuel delivery system which minimizes changes in engine thrust when switching from a primary control to a backup or secondary control.

DISCLOSURE OF INVENTION

The object of the subject invention is to provide an improved fuel delivery system which minimizes changes in engine thrust when switching from a primary control to a backup or secondary control. The object of the subject invention is achieved by the fuel delivery system described herein.

The fuel delivery system comprises a primary control means for commanding a first flow of fuel to the engine wherein the primary control is responsive to a first set of parameters indicative of an engine condition.

The fuel delivery system further comprises a secondary control means for commanding a second flow of fuel to the engine wherein said secondary control is responsive to a second set of parameters indicative of said engine condition, and wherein said second flow of fuel commanded by said secondary control may differ from said first flow of fuel commanded by said primary control for said engine condition. The fuel delivery system also includes a means for selecting either said primary control or said secondary control and a tracking means for minimizing the difference between said second flow of fuel commanded by the secondary controller and said first flow of fuel commanded by the primary controller.

BRIEF DESCRIPTION OF DRAWINGS

FIG. 3 is a schematic view of a fuel delivery system in accordance with the present invention.

BEST MODE FOR CARRYING OUT THE INVENTION

Figure 1:
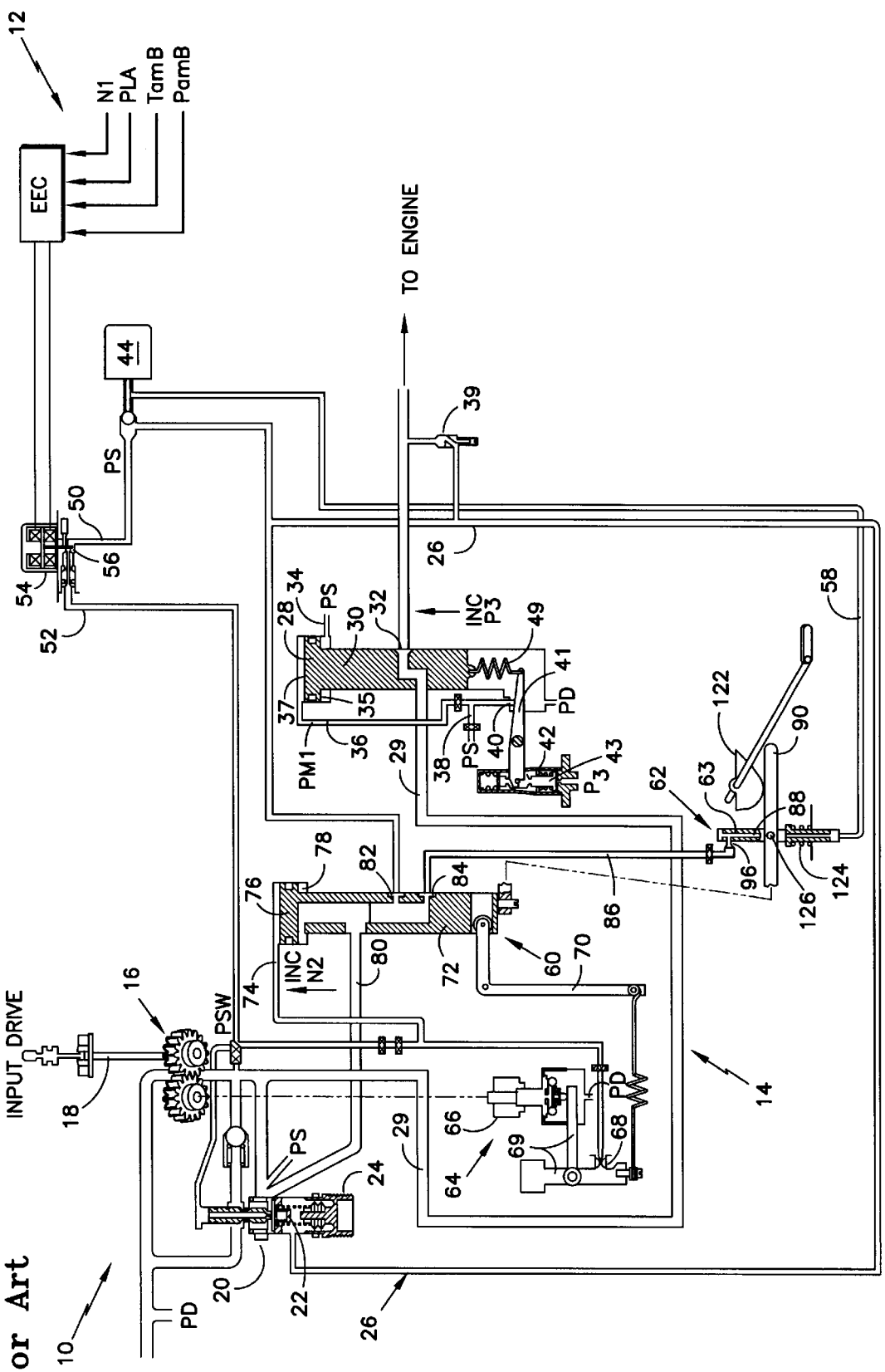
FIG. 1 is a schematic view of a prior art fuel delivery system.

A prior art fuel control 10 is shown in FIG. 1. The fuel control 10 has two main sections, electronic engine control (EEC) 12 and a hydromechanical unit (HMU) 14. The fuel control has two operating modes. In the primary or normal operating mode the EEC 12 schedules fuel delivery, to achieve a desired engine speed, in combination with the HMU 14 and in the secondary or backup mode, the HMU 14 schedules fuel flow to achieve a desired engine speed.

Pressurized fuel is provided to the HMU 14 by a positive displacement pump 16. The positive displacement pump 16 is driven by a shaft 18 which in turn is driven by the turbine engine (not shown). Therefore the fuel provided by the positive displacement pump 16 is proportional to engine speed. Furthermore the fuel provided by the positive displacement pump exceeds the engine requirements. A portion of the excess fuel provided by the positive displacement pump 16 must be bypassed from the fuel control 10 to the inlet of the pump 16. The amount of fuel bypassed is determined by the pressure regulating valve (PRV) 20. The PRV 20 will bypass fuel flow whenever the pressure drop across the computing flow network which consists of a decel port 82, accel port 84 and droop valve 62 in the manual mode, or the decel port 82 and torque motor flapper valve 56 in the primary mode exceeds the bias pressure setting of the PRV 20. The bias pressure of the PRV 20 has a nominal value as set by spring 22 which can be adjusted by screw 24.

The output of the positive displacement pump 16, not bypassed by the PRV 20 is input to a metering valve 28 via line 29. The metering valve contains a spool 30 which in turn contains a metering window 32, the position of which controls the flow of fuel to the engine. Operation of the metering valve 28 is based upon incompressible flow theory which states that flow through a valve is a function of the area of the valve opening multiplied by the square root of the product of the pressure drop across the valve multiplied by the specific gravity of the fluid. The pressure drop across the metering valve 28 is equal to the constant pressure drop across the PRV 20 plus a variable pressure drop across the ratio unit (RU) orifice 39. Therefore, fuel delivery to the engine can be controlled by varying the fuel pressure across the RU orifice 39 and by varying the area of the metering window 32.

The metering valve varies flow as a function of compressor discharge pressure (P3). The metering valve spool 30 is positioned via a force balance system 42 which consists of P3 bellows 43, force balance linkage 41, and feedback spring 49. The force output of the P3 bellows 43 acts on the flapper 40 through a force balance linkage 41. The flapper 40 controls a pressure Pm1 at first end 37 of half area servo 30. Pm1 works in conjunction with Ps (pump output pressure) acting on a second end 35 of half area servo 30 to position half area servo 30. Feedback spring 49 counter balances the force of the P3 bellows 43. Thus the position of the half area servo 30 and hence the metering valve window 32 area are directly proportional to P3.

Figure 2:
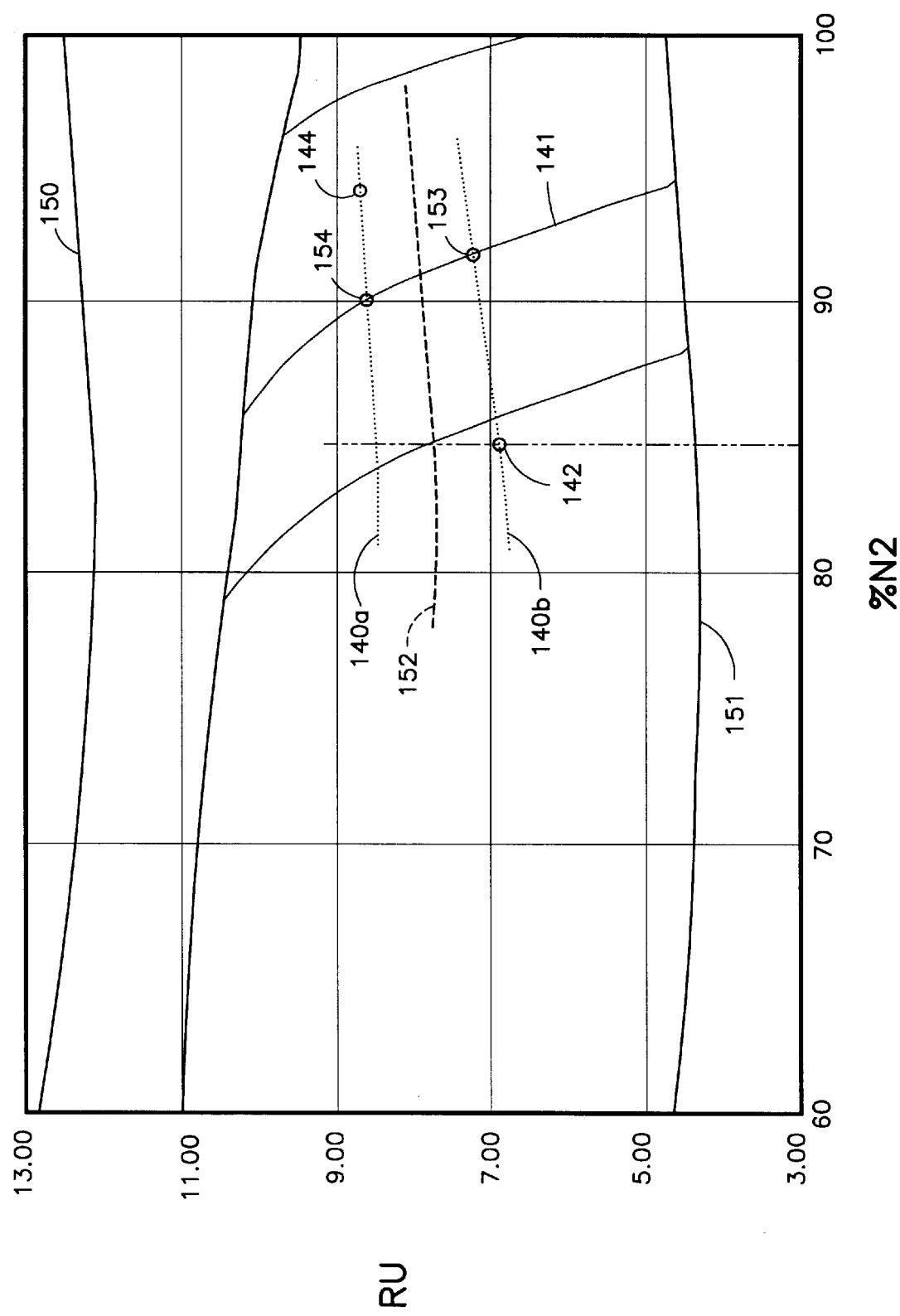
FIG. 2 is a graph illustrating scheduled fuel flow by the EEC/HMU.

The pressure drop across the RU orifice 39 is a function of the flow across the RU orifice 39, hereinafter computing flow. In the backup mode the HMU 14 schedules computing flow as required for either acceleration or deceleration. In the normal mode the HMU 14 deceleration computing flow becomes the minimum EEC schedule, and the EEC 12 schedules additional computing flow as required to control the rate of acceleration or deceleration. The maximum EEC schedule 150 is shown in FIG. 2.

The operating mode is selected by the positioning of the transfer solenoid 44. In the normal mode the transfer solenoid 44 is energized which places the EEC 12 controlled computing flow of line 50 in fluid communication with the bias pressure line 26. The EEC 12 controls the computing flow in line 50 by varying the gap of the flapper valve 56 through torque motor 54. The PRV 20 maintains a constant bias pressure across the flapper valve 56. The EEC 12 modulates computing flow in response to ambient temperature, ambient pressure, the speed of the first turbine (N1) and power lever angle to achieve a desired engine speed.

In the backup mode the transfer control valve solenoid 44 is de-energized which place the HMU 14 controlled computing flow of line 58 in fluid communication with the bias pressure line 26.

The HMU 14 schedules computing flow as a function of power lever angle and the speed of the second turbine N2. Computing flow is scheduled through the N2 servo valve 60 and the droop valve 62

The N2 servo valve 60 contains a spool 72 which is positioned by a modulating pressure on line 74 acting on a first end 76 and a supply pressure on line 80 acting on a second end 78 of spool 72. The position of the spool 72 determines the flow area of ports 82 and 84. The modulating pressure on line 74 is controlled by N2 control system 64 which consists of governor 66, flapper valve 68, beam 69, and feedback spring and lever 70. As shaft 18 speed increases, governor 66 acts on beam 69 to open flapper valve 68, which decreases modulating pressure in line 74. As spool 72 travels, feedback spring and lever 70 reposition beam 69 to close flapper 68, thus maintaining N2 control system 64 in force balance.

Port 84 is connected to a droop valve 62 via fuel line 86. The droop valve 62 contains a spool 88 the position of which is controlled by the power lever angle set by the pilot through mechanical link 90. N2 servo valve 60 position feedback is also communicated to the droop valve 62 via mechanical link 90. Mechanical link 90 is urged against the power lever cam 122 by spring 124. The output of the droop valve is communicated via line 58 to the transfer solenoid 44, the position of which determines whether the EEC 12 or HMU 14 controls the computing flow across the RU orifice 39.

The operation of the N2 servo 60, droop valve 62 and N2 servo feedback system 64 for acceleration in the manual mode is as follows. The pilot increases power lever angle which through mechanical link 90 forces spool 88 of droop valve 62 in a downward direction. This causes window 96 in spool valve 88 to open placing the pressure in line 86 in fluid communication with line 58 which is in fluid communication with the RU orifice via line 26. The computing flow across the RU orifice 39 is therefore increased, increasing the pressure drop across the metering valve 28, increasing the flow of fuel to the engine. The increased fuel flow increases engine speed which in turn increases the shaft 18 speed sensed by the governor 66 opening flapper valve 68. The opening of flapper valve 68 reduces the modulating pressure at first end 76 causing spool 72 to move in an upward direction. The movement of spool 72 is tracked by feedback lever and spring 70 to reposition beam 69 to close window 96 in droop valve 62. This process continues until a new steady state position is reached.

FIG. 2 illustrates the ratio units (RU) as scheduled by the EEC 12 and HMU 14. Fuel flow to the engine equals the scheduled RU multiplied by the engine discharge pressure P3. The EEC 12 schedules fuel flow as a function of N1 and ambient temperature to achieve the desired engine speed. The HMU 14 schedules fuel as a function of N2 and power lever angle.

Steady state run lines 140a and 140b illustrates the required RU's to maintain the engine speeds for a given set of ambient conditions. Operating point 142 corresponds to the engine speed and RU necessary to achieve a desired takeoff thrust on a cold day at sea level. Operating point 144 corresponds to the engine speed and fuel flow necessary to achieve takeoff thrust on a hot day at sea level. Droop line 141 is a plot of the RU vs. engine speed as set by the HMU 14 for the power setting for takeoff.

The EEC 12 varies torque motor current to set the operating point (e.g. 142 or 144) to achieve takeoff thrust as a function of ambient conditions.

For a hot day condition the EEC commands a higher engine speed to achieve the desired thrust. If the control were switched to the HMU 14 the engine would decelerate to the speed corresponding to the RU commanded by the HMU 12 for the power lever angle for takeoff. The result would be a loss of thrust. On a cold day where lower engine speed is required for takeoff thrust, there would be an increase in thrust when switching from EEC 12 to HMU 14 control.

FIG. 3 shows an improved fuel control 110 according to the present invention. The improved fuel control contains a tracking valve 112 and transfer valve 46.

The operating mode is selected by the positioning of the transfer valve 46. In the normal mode the transfer valve control solenoid 44 is energized porting the first end 45 of control piston 48 of transfer valve 46 to drain pressure (PD). Supply pressure (PS) acting on a second end 51 causes valve element 47 to translate to the left, which places the EEC 12 controlled computing flow of line 50 in fluid communication with the bias pressure line 26. The EEC 12 controls the computing flow in line 50 by varying the gap of the flapper valve 56 through torque motor 54. The EEC 12 modulates computing flow in response to ambient temperature, ambient pressure, the speed of the first turbine (N1) and power lever angle to achieve a desired engine speed. In addition, the flow from droop valve 62 is ported to an orifice 125 and to the first end 114 of tracking piston 120. In this mode the droop valve 62 position acts to reposition the tracking valve 112 as described in greater detail herein.

A first end 119 of tracking link 121 is slidably connected to tracking valve piston 120. A second end 123 of tracking link 120 is connected to mechanical link 90 at cam roller 130. Therefore left, right movement of first end 119 will impart a rotational force to mechanical link 90, via second end 123, causing droop valve spool 88 to move either upwardly or downwardly.

The EEC 12 can schedule a computing flow that is different from that scheduled by the HMU 14 for a given condition. The case where EEC 12 schedules a computing flow that is higher (hot day) than the computing flow being scheduled by the HMU 14 is as follows. EEC 12 opens flapper valve 56, through torque motor 54, increasing fuel flow in computing flow line 50. The increased fuel flow in computing flow line 59 increases the pressure drop across RU orifice 39 increasing the pressure drop across the metering valve 28 causing increased fuel flow to the engine, increasing engine speed. As engine speed increases, governor 66 causes flapper valve 68 to open which reduces the modulating pressure in line 74 and at first end 76 of spool 72. This causes spool 72 to move in an upward direction. The movement of spool 72 through link 90 causes droop valve 62 to close. This reduces the pressure at first end 114 of tracking valve 112 causing piston 120 to translate to the left. The translation of piston 120 moves first end 119 of tracking link 121 to the left which imparts a rotational force via second end 123 to mechanical link 90. Mechanical link 90 is fixed at a first end 132 for movement with the N2 spool 72 and to the droop valve spool 63 at point 126. The second end 134 of mechanical link 90 is not fixed but is urged against power lever cam 122 by spring 124 of droop valve 62.

The rotational force imparted by the tracking link 121 forces the mechanical link 90 downwardly relative to N2 spool 72 which translates the droop valve spool 63 downwardly opening droop valve 62. The droop valve 62 opens until spool 120 is in force balance. In this manner the droop valve opening 65 commanded by HMU 14 is held constant regardless of the engine speed commanded by EEC 12 as opposed to the prior art wherein the droop valve opening 65 would be reduced or remain closed as long as the EEC 12 scheduled an engine speed greater than that scheduled by HMU 14. The movement of the tracking link 118 maintains a constant droop valve opening 65 effectively biases the PLA cam 122 causing the HMU 14 to command a biased RU that is optimized for the minimum and maximum RU which can be scheduled by EEC 12 during takeoff. This is shown as tracking line 152 located approximately halfway between the maximum RU 144 and minimum RU 142 scheduled by EEC 12.

The case where EEC 12 schedules a computing flow that is lower (cold day) than the computing flow being scheduled by the HMU 14 is as follows. EEC 12 closes flapper valve 56, through torque motor 54, decreasing fuel flow in computing flow line 50. The decreased fuel flow in computing flow line 59 decreases the pressure drop across RU orifice 39 decreasing the pressure drop across the metering valve 28 causing decreased fuel flow to the engine, decreasing engine speed. As engine speed decreases, the governor 66 causes flapper valve 68 to close increasing the modulating pressure in line 74 and at first 76 of spool 72. This causes spool 72 to move in an downward direction. The movement of spool 72 through link 90 causes droop valve 62 to open. This increases the pressure at first end 114 of tracking valve 112 causing piston 120 to translate to the right. The translation of piston 120 moves first end 119 of tracking link 121 to the right which imparts a rotational force via second 123 to mechanical link 90.

The rotational force imparted by the tracking link 121 forces the mechanical link 90 upwardly relative to N2 spool 72 which translates the droop valve spool 63 upwardly closing droop valve 62 decreasing the modulating pressure in line 74. The droop valve 62 remains closed until spool 120 is in force balance. In this manner the droop valve opening commanded by the HMU 14 is held constant regardless of engine speed, as opposed to the prior art wherein the droop valve 62 would be increased or remain open as long as the EEC 12 scheduled an engine speed less than that scheduled by HMU 14. The movement of the tracking link 118 maintains a constant droop valve opening 65 effectively biasing the PLA cam 122 causing the HMU 14 to command the same fuel flow as the EEC 12 for a given PLA setting.

Upon transfer of control from the EEC 12 to the HMU 14 the transfer solenoid 44 is de-energized placing Ps in fluid communication with control valve 48 causing transfer valve 46 to translate to the right placing the line 58 in fluid communication with bias pressure line 26. This effectively allows the HMU 14 to control the flow of fuel to the engine. The de-energizing of transfer solenoid 44 also place Ps in fluid communication with locking valve 136. This effectively locks the spool 120 and the tracking link 121 in place. Commonly owned U.S. Pat. No. 5,735,122 incorporated herein by reference, discloses a preferred locking valve. In this manner the droop valve opening commanded by HMU 14 is held constant regardless of the engine speed commanded by EEC 12.

An additional feature of the subject invention is provided spring 117 of the tracking valve 112. If the pilot wishes to start in the backup or secondary mode the spring will force the tracking piston 120 to the left, against stop 136 which will minimize the bias of the PLA cam 122. Upon system start the tracking piston 120 will be locked in place by the locking valve 138.

Although the invention has been shown and described with respect to a best mode embodiment thereof, it should be understood by those skilled in the art that the foregoing and various other changes, omissions, and additions in the form and detail thereof may be made without departing from the spirit and scope of the invention.

We claim:

1. A fuel control for supplying a flow of fuel to a turbine engine wherein said fuel control is responsive to a computing flow input for setting the flow of fuel comprising:

a primary control means for setting the computing flow input to a first computing flow;

a secondary control means for setting the computing flow input to a second computing flow;

a transfer means for transferring the computing flow input from said first computing flow to said second computing flow; and a tracking means for ensuring said second computing flow is approximately equal to said first computing flow.

2. The fuel control of claim 1 wherein said primary control means sets said first computing flow in response to a first set of parameters.

3. The fuel control of claim 2 wherein said secondary control means sets said second computing flow in response to a second set of parameters.

4. The fuel control of claim 3 wherein said second set of parameters comprises a power lever angle.

5. The fuel control of claim 4 wherein said tracking means further comprises a valve responsive to said second computing flow for adding a bias to said power lever angle.

6. The fuel control of claim 5 wherein said tracking means further comprises a locking means for maintaining said bias upon transfer from said first computing flow to said second computing flow.

7. The fuel control of claim 1 further comprising a means for sensing a failure in said primary control and transferring the computing flow input from said first computing flow to said second computing flow in response to said failure.

8. The fuel control of claim 7 further comprising a means for sensing an operator input and transferring the computing flow input from said first computing flow to said second computing flow in response to said operator input.

9. The fuel control of claim 5 wherein said tracking means further comprises a means for resetting said bias upon engine shutdown.

10. The fuel control of claim 1 wherein said primary control comprises an electronic control.

11. The fuel control of claim 8 wherein said secondary control comprises a hydromechanical fuel control.

* * * * *